United States Patent
Tu et al.

(10) Patent No.: US 11,876,164 B2
(45) Date of Patent: Jan. 16, 2024

(54) ELECTRODE CORE ENCASING APPARATUS, BATTERY CELL ASSEMBLING APPARATUS, AND ELECTRODE CORE ASSEMBLING METHOD

(71) Applicant: CONTEMPORARY AMPEREX TECHNOLOGY CO., LIMITED, Ningde (CN)

(72) Inventors: Yinhang Tu, Ningde (CN); Yuan Peng, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/348,345

(22) Filed: Jul. 7, 2023

(65) Prior Publication Data

US 2023/0352721 A1    Nov. 2, 2023

Related U.S. Application Data

(63) Continuation of application No. PCT/CN2022/128084, filed on Oct. 27, 2022.

(30) Foreign Application Priority Data

Oct. 27, 2021  (CN) .......................... 202111258364.6

(51) Int. Cl.
   *H01M 10/00*   (2006.01)
   *H01M 10/04*   (2006.01)
   *H01M 10/0587*  (2010.01)

(52) U.S. Cl.
   CPC ..... *H01M 10/0409* (2013.01); *H01M 10/049* (2013.01); *H01M 10/0431* (2013.01); *H01M 10/0587* (2013.01)

(58) Field of Classification Search
   CPC .. H01M 10/02; H01M 10/04; H01M 10/0404; H01M 10/0422; H01M 50/10; B28D 1/22; B28D 7/00; B28D 7/04
   See application file for complete search history.

(56) References Cited

U.S. PATENT DOCUMENTS 4,296,546 A * 10/1981 Hill ................... H01M 10/0409
                                                    29/730

FOREIGN PATENT DOCUMENTS

CN          2865022 Y    1/2007
CN        101783415 A    7/2010
(Continued)

OTHER PUBLICATIONS

The World Intellectual Property Organization (WIPO) International Search Report and Written Opinion for PCT/CN2022/128084 dated Jan. 28, 2023 15 pages (Including English translation).

*Primary Examiner* — Cynthia H Kelly
*Assistant Examiner* — Monique M Wills
(74) *Attorney, Agent, or Firm* — ANOVA LAW GROUP, PLLC (57) ABSTRACT

An electrode core encasing apparatus includes a main power mechanism, a housing fixing mechanism, an encasing mechanism, and an electrode core fixing mechanism. The housing fixing mechanism is disposed on one side of the encasing mechanism, which is located between the housing fixing mechanism and the electrode core fixing mechanism. The encasing mechanism includes an encasing mechanism body and an XY floating slide block. Two ends of the XY floating slide block are connected to the main power mechanism and the encasing mechanism body, respectively. The XY floating slide block is configured to drive the encasing mechanism body to slide freely relative to the main power mechanism, so as to adjust a relative position between the housing and the electrode core. The main power mechanism (Continued)

is configured to drive the housing fixing mechanism and the encasing mechanism to move to sleeve the electrode core into the housing.

20 Claims, 7 Drawing Sheets

(56) References Cited

FOREIGN PATENT DOCUMENTS

| | | |
|---|---|---|
| CN | 106571482 A | 4/2017 |
| CN | 106684462 A | 5/2017 |
| CN | 107482245 A | 12/2017 |
| CN | 112404942 A | 2/2021 |
| WO | 2020173142 A1 | 9/2020 |

* cited by examiner

ELECTRODE CORE ENCASING APPARATUS, BATTERY CELL ASSEMBLING APPARATUS, AND ELECTRODE CORE ASSEMBLING METHOD

CROSS-REFERENCE TO RELATED APPLICATIONS

This application is a continuation of International Application No. PCT/CN2022/128084, filed on Oct. 27, 2022, which claims priority to Chinese Patent Application No. 202111258364.6, filed with the National Intellectual Property Administration, PRC on Oct. 27, 2021 and entitled "ELECTRODE CORE ENCASING APPARATUS, BATTERY CELL ASSEMBLING APPARATUS, AND ELECTRODE CORE ASSEMBLING METHOD", which are incorporated herein by reference in their entirety.

TECHNICAL FIELD

This application relates to the technical field of battery manufacturing, and in particular, to electrode core encasing apparatus, battery cell assembling apparatus, and an electrode core assembling method.

BACKGROUND

Energy conservation and emission reduction are key to sustainable development of the automobile industry. Electric vehicles have become an important part of the sustainable development of the automobile industry by virtue of energy saving and environmental friendliness. Battery technology is crucial to development of electric vehicles.

With the development of the battery technology, the performance of a battery is not only affected by the battery material, but is also crucially bottlenecked by the manufacturing process of the battery. During research, the applicant finds that in an existing battery manufacturing process, problems such as damage to an electrode core or a housing are prone to occur during assembling of the electrode core and the housing.

In accordance with the disclosure, there is provided an electrode core encasing apparatus including a main power mechanism, a housing fixing mechanism, an encasing mechanism, and an electrode core fixing mechanism. The electrode core fixing mechanism is configured to fix an electrode core. The housing fixing mechanism is disposed on one side of the encasing mechanism, and is configured to fix a housing and drive the housing to move. The encasing mechanism is located between the housing fixing mechanism and the electrode core fixing mechanism. The encasing mechanism comprises an encasing mechanism body. An XY floating slide block is disposed on one side of the encasing mechanism body. One end of the XY floating slide block is connected to the main power mechanism. Another end of the XY floating slide block is connected to the encasing mechanism body. The XY floating slide block is configured to drive the encasing mechanism body to slide freely relative to the main power mechanism, so as to adjust a relative position between the housing and the electrode core. The main power mechanism is configured to drive the housing fixing mechanism and the encasing mechanism to move to sleeve the electrode core into the housing.

Also in accordance with the disclosure, there is provided a battery cell assembling apparatus including an electrode core encasing apparatus. The electrode core encasing apparatus includes a main power mechanism, a housing fixing mechanism, an encasing mechanism, and an electrode core fixing mechanism. The electrode core fixing mechanism is configured to fix an electrode core. The housing fixing mechanism is disposed on one side of the encasing mechanism, and is configured to fix a housing and drive the housing to move. The encasing mechanism is located between the housing fixing mechanism and the electrode core fixing mechanism. The encasing mechanism comprises an encasing mechanism body. An XY floating slide block is disposed on one side of the encasing mechanism body. One end of the XY floating slide block is connected to the main power mechanism. Another end of the XY floating slide block is connected to the encasing mechanism body. The XY floating slide block is configured to drive the encasing mechanism body to slide freely relative to the main power mechanism, so as to adjust a relative position between the housing and the electrode core. The main power mechanism is configured to drive the housing fixing mechanism and the encasing mechanism to move to sleeve the electrode core into the housing.

Also in accordance with the disclosure, there is provided an electrode core assembling method including providing a housing and an electrode core, moving the housing and the electrode core separately into an accommodation cavity, adjusting a relative position between the electrode core and the housing, and sleeving the electrode core into the housing.

BRIEF DESCRIPTION OF DRAWINGS

To describe the technical solutions in some embodiments of this application more clearly, the following outlines the drawings to be used in some embodiments or exemplary technical description. Evidently, the drawings outlined below are merely some embodiments of this application. A person of ordinary skill in the art may derive other drawings from such drawings without making any creative efforts.

REFERENCE NUMERALS electrode core encasing apparatus 1000;
main power mechanism 100, encasing mechanism connecting support 110, encasing mechanism connecting plate 120, encasing mechanism fixing hole 121;
housing fixing mechanism 200, housing fixing mechanism support 210, housing clamping portion 220;
encasing mechanism 300, encasing mechanism body 301, accommodation cavity 310, encasing barrier film 3101, first guide ramp 3102, second guide ramp 3103;

first flaring mechanism 320, second flaring mechanism 321, flaring air cylinder 3210, flaring suction cup 3211;

first XY floating slide block 330, second XY floating slide block 331, third XY floating slide block 332, fourth XY floating slide block 333; fixing hole 3321 of encasing mechanism connecting plate; first X-axis floating slide block 3322, second X-axis floating slide block 3324, first X-axis floating slide rail 3323, second X-axis floating slide rail 3325, first Y-axis floating slide block 3326, second Y-axis floating slide block 3328, first Y-axis floating slide rail 3327, and second Y-axis floating slide rail 3329;

first parting mechanism 340, second parting mechanism 341, first parting connecting piece 3401, second parting connecting piece 3411, first parting connecting plate 3402, second parting connecting plate 3412;

realignment mechanism 350; main power mechanism connecting shaft 3501, main power mechanism connecting plate 3502, first realignment clamping mechanism 3503, second realignment clamping mechanism 3504, gripper cylinder 3505;

housing fixing mechanism bracket 360;

electrode core fixing mechanism 400, housing 500, electrode core 600.

DETAILED DESCRIPTION OF EMBODIMENTS

To make the objectives, technical solutions, and advantages of this application clearer, the following describes this application in further detail with reference to drawings and embodiments. Understandably, the specific embodiments described herein are merely intended to explain this application, but not to limit this application.

It is hereby noted that a component referred to as being "fixed to" or "disposed on" another component may be directly positioned onto the other component or may be positioned onto the other component indirectly through an intermediate component. A component referred to as "connected to" another component may be directly or indirectly connected to the other component. A direction or a positional relationship indicated by the terms such as "up", "down", "left", and "right" is a direction or positional relationship based on the illustration in the drawings, and is merely intended for ease of description but without indicating or implying that the indicated device or component is necessarily located in the specified direction or constructed or operated in the specified direction. Therefore, such terms do not constitute any limitation on this application. A person of ordinary skill in the art may understand the specific meanings of such terms depending on specific situations. The terms "first" and "second" are used merely for ease of description, but without indicating or implying relative importance or implicitly specifying the number of technical features. Unless otherwise expressly specified, "a plurality of" means two or more.

To describe the technical solutions provided in this application, the following describes this application in detail with reference to drawings and embodiments.

Currently, the market trend shows that batteries are applied more extensively. Batteries are not only used in energy storage power systems such as hydro, thermal, wind, and solar power stations, but also widely used in electric means of transport such as electric bicycles, electric motorcycles, and electric vehicles, and used in many other fields such as military equipment and aerospace. The market demand for batteries keeps soaring with the increase of the application fields of the batteries.

With the gradual popularization of batteries, the manufacturing process of batteries has become crucial. The manufacturing process of the batteries significantly affects the production efficiency of the batteries on the one hand, and affects the exertion of performance of the batteries on the other hand. If the manufacturing process of the batteries is not perfect, the yield rate of the batteries will decrease during the manufacture, or the batteries will be defective in some aspects, thereby impairing the performance or even lifespan of the batteries.

Currently, a battery cell primarily includes a housing and an electrode assembly. The electrode assembly is disposed in the housing. The housing is a component that forms an internal environment of the battery cell. The formed internal environment may be used to accommodate the electrode assembly, an electrolytic solution, and other components. The housing is a structure that is opened at one end and hollowed out. The electrode core is disposed inside the housing. An end cap covers the opening of the housing. At the opening, the end cap fits and covers the opening to form the internal environment of the battery cell. Definitely, the end cap and the housing may be integrated instead. Specifically, a common junction surface may be formed between the end cap and the housing first before other components are encased in the housing. Subsequently, when the housing needs to be internally sealed, the end cap is made to fit and cover the housing. The housing may vary in shape and size. For example, the housing is cuboidal, cylindrical, hexagonal prismatic, or the like. Specifically, the shape of the housing may be determined depending on the specific shape and size of an electrode assembly. The housing may be made of a variety of materials such as copper, iron, aluminum, stainless steel, aluminum alloy, or plastic, without being particularly limited herein.

The electrode assembly is a component that reacts electrochemically in the battery cell. The housing may contain one or more electrode assemblies. An electrode assembly is primarily formed by winding or stacking a positive electrode plate and a negative electrode plate, and a separator is generally disposed between the positive electrode plate and the negative electrode plate. The parts, coated with an active material, of the positive electrode plate and the negative electrode plate, constitute a body portion of the electrode assembly. The part, coated with no active material, of the positive electrode plate and the negative electrode plate separately, constitutes a tab. The positive tab and the negative tab may be located at one end of the body portion together or at two ends of the body portion respectively. In a process of forming the electrode assembly, after the positive electrode plate, the negative electrode plate, and the separator material are wound, an electrolytic solution needs to be injected into the electrode assembly. The wound electrode assembly sufficiently absorbs the injected electrolytic solution, so that the electrode assembly and the electrolytic solution are sufficiently blended to achieve the best infiltration effect. In a charge-and-discharge process of the battery, the positive active material and the negative active material react with an electrolytic solution. The tabs are connected to electrode terminals to form a current circuit.

The applicant of this application has noticed that in an assembling process of a lithium battery, the assembling of the housing and the electrode core is essential. The assembling of the housing and the electrode core may be assembled in a variety of manners. A horizontal encasing manner is typically used in the industry, in which a horizontally placed electrode core is pushed into the housing along a guide plate. The applicant of this application finds that in the process of pushing the electrode core into the housing in this way, a Mylar film that overlays the electrode core is prone to rub against the guide plate and the entrance of the housing, thereby scratching the Mylar film. In addition, the top cap of the electrode core also rubs against the guide plate, the entrance of the housing, and the like, thereby causing damage to the housing and the Mylar film. Furth, in a process of pushing the electrode core into the housing, the electrode core is shifted downward to some extent during movement due to gravity. Consequently, a terrace is formed between the entrance of the housing and the top cap, making it difficult to push the electrode core into the housing. Moreover, dimension errors are prone to occur in the materials of the housing and the electrode core. In the current encasing method, the position of the electrode core is unable to be adaptively adjusted according to the corresponding errors, thereby causing damage to the entrance of the housing and the top cap during the encasing.

To solve the problem that the electrode core fails to be encased in a housing due to misalignment between the housing and the electrode core, an embodiment of this application discloses electrode core encasing apparatus, battery cell assembling apparatus, and an electrode core assembling method. In the apparatus, an XY floating slide block is disposed to enable the encasing mechanism to float relative to the main power mechanism, thereby automatically adjusting the relative position between the electrode core and the housing, enabling the electrode core and the housing to be aligned adaptively, and preventing the misalignment between the electrode core and the housing from causing encasing difficulty and damage to the electrode core or housing. In addition, a realignment mechanism is disposed. The realignment mechanism can realign the encasing mechanism upon completion of the encasing operations for each electrode core, thereby preventing increase of misalignment between the housing and the electrode core, further ensuring accuracy of the relative position between the housing and the electrode core, and improving the efficiency of assembling the electrode core and the housing. Further, one aspect of some embodiments of this application further provides an accommodation cavity at the encasing mechanism. Therefore, the positions of the housing and the electrode core can be automatically rectified before the electrode core is encased in the housing, thereby ensuring alignment between the electrode core and the housing. On the other hand, in order to enable the electrode core to quickly enter the accommodation cavity, a guide ramp is disposed at an edge of the accommodation cavity to guide the electrode core into the accommodation cavity. In the guiding process, if the electrode core moves out of alignment with the housing, the XY floating slide block causes the encasing mechanism to float, so as to exert a pressure on the realignment direction when the electrode core contacts and presses the guide ramp, thereby guiding the encasing mechanism to automatically adjust its position and adaptively realign the housing with the electrode core. In this way, the housing can accurately enter the accommodation cavity, thereby ensuring the alignment between the housing and the electrode core, and preventing damage to the Mylar film of the electrode core caused by misalignment during encasing of the electrode core. In addition, in order to avoid contact and friction between the electrode core and the entrance of the housing during the encasing of the electrode core and avoid damage to the Mylar film of the electrode core and the entrance of the housing caused by the friction, an embodiment of this application further disposes an encasing barrier film at the edge of the accommodation cavity to separate the housing from the electrode core and prevent the entrance of the housing from scratching the Mylar film of the electrode core. In this embodiment of this application, before the electrode core is positioned into the housing, the outer wall of the housing is flared by a flaring mechanism, thereby flaring out the entrance of the housing and making it convenient to put the electrode core into the entrance of the housing.

Figure 1:
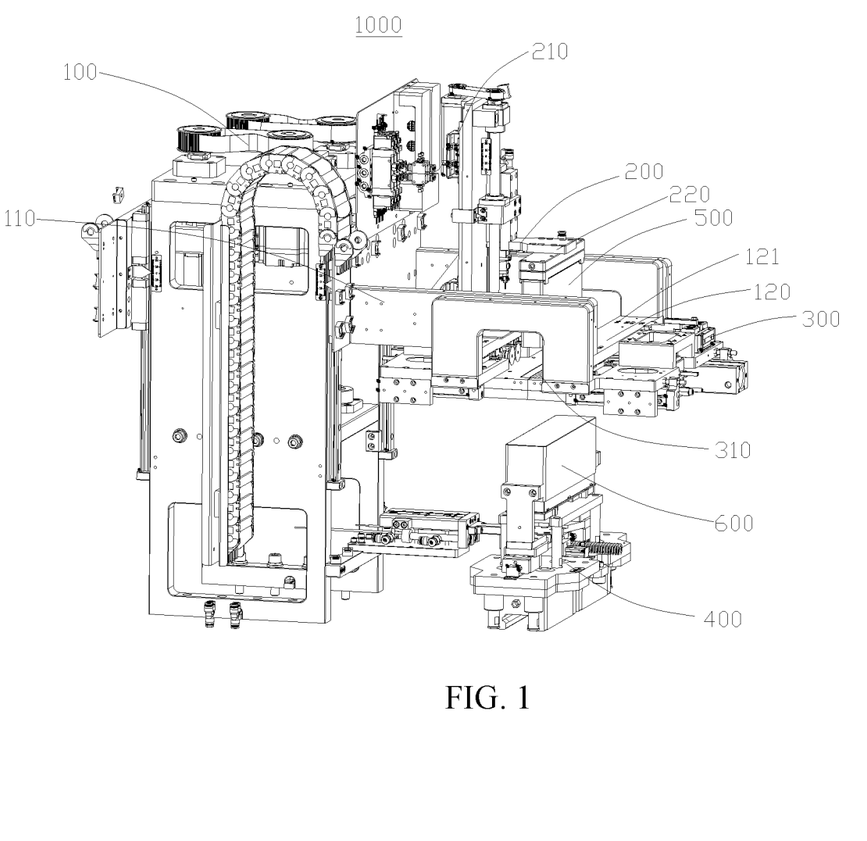
FIG. 1 is a three-dimensional diagram of electrode core encasing apparatus according to some embodiments of this application.
Figure 2:
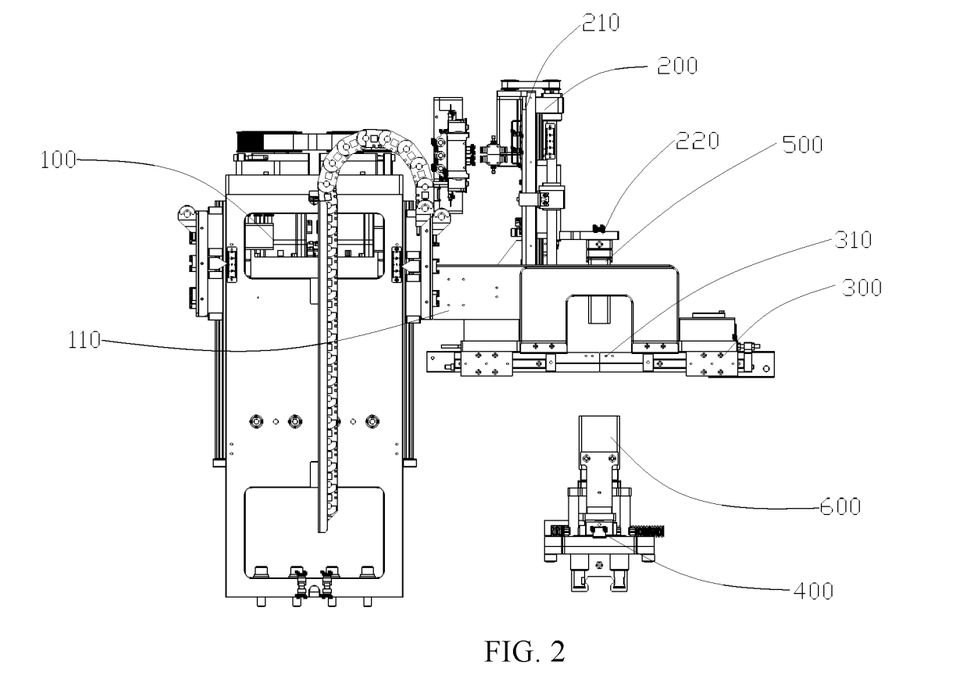
FIG. 2 is a side view of electrode core encasing apparatus according to some embodiments of this application.
Figure 3:
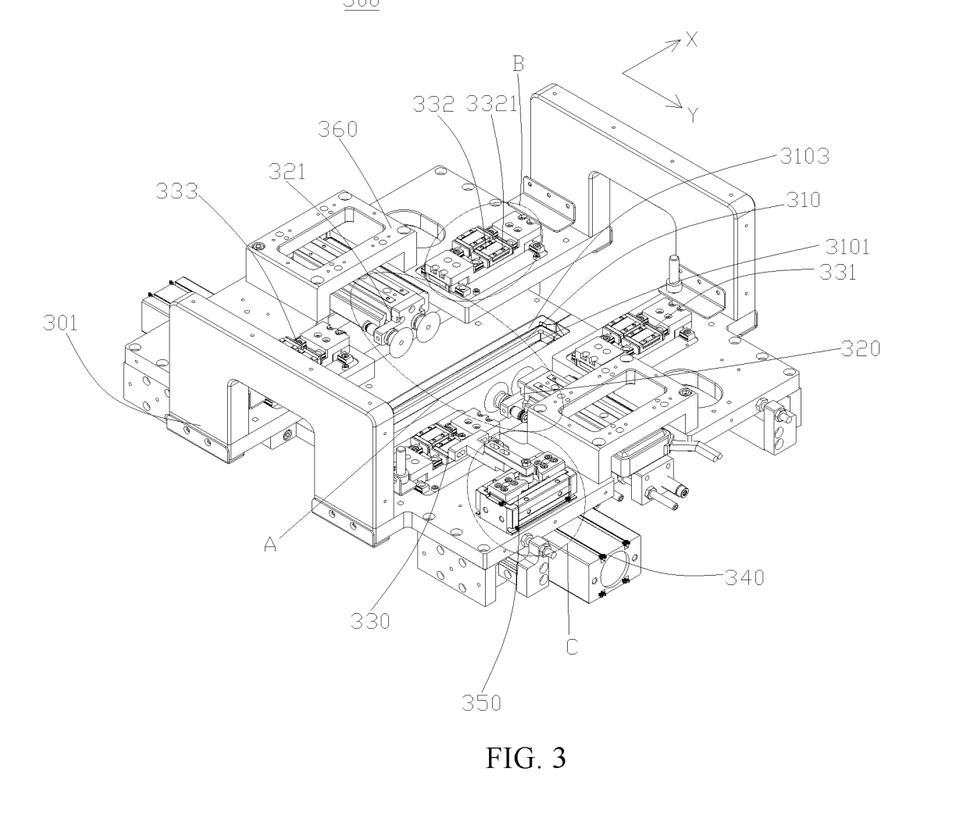
FIG. 3 is a three-dimensional diagram of an encasing mechanism according to some embodiments of this application.

In order to solve the above problem, an embodiment of this application discloses electrode core encasing apparatus 1000. As shown in FIG. 1 and FIG. 2, FIG. 1 is a three-dimensional diagram of the electrode encasing apparatus 1000, and FIG. 2 is a side view of the electrode core encasing apparatus 1000. The apparatus includes: a main power mechanism 100, a housing fixing mechanism 200, an encasing mechanism 300, and an electrode core fixing mechanism 400. The electrode core fixing mechanism 400 is configured to fix the electrode core 600. Such mechanisms coordinate with each other to sleeve the electrode core 600 into the housing 500. The housing fixing mechanism 200 is disposed on one side of the encasing mechanism 300 and is fixedly connected to the encasing mechanism 300, and is configured to fix the housing 500 and drive the housing 500 to move. The encasing mechanism 300 is located between the housing fixing mechanism 200 and the electrode core fixing mechanism 400, and is movably connected to the main power mechanism 100. The main power mechanism 100 drives the housing fixing mechanism 200 and the encasing mechanism 300 to move to sleeve the electrode core 600 into the housing 500. As shown in FIG. 3, the encasing mechanism 300 includes an encasing mechanism body 301. In order to align the electrode core 600 with the housing 500 more accurately, an XY floating slide block is disposed on one side of the encasing mechanism body 301. The XY floating slide block includes two ends that slide relative to each other. One end of the XY floating slide block is connected to the main power mechanism 100, and the other end is connected to the encasing mechanism body 301. The XY floating slide block is configured to drive the encasing mechanism body 301 to slide freely relative to the main power mechanism 100. Because the electrode core 600 is stationary relative to the main power mechanism 100, the position of the encasing mechanism body 301 is adjustable relative to the electrode core 600, thereby adjusting the relative position between the housing 500 and the electrode core 600.

The main power mechanism 100 is a main motive power mechanism of the electrode core encasing apparatus 1000, and is connected to the encasing mechanism 300 to drive the encasing mechanism 300 to move up and down as a whole. The housing fixing mechanism 200 is configured to fix the housing 500 and drive the housing 500 to move. The housing fixing mechanism 200 may be fixedly connected to the encasing mechanism 300. When the main power mechanism 100 drives the encasing mechanism 300 to move, the housing fixing mechanism 200 may move together. The electrode core fixing mechanism 400 is located on one side that is of the encasing mechanism 300 and that is away from the housing fixing mechanism 200, so that the encasing mechanism 300 is located between the housing fixing mechanism 200 and the electrode core fixing mechanism 400. In this way, the electrode core 600 can be fitted into the housing 500 by the encasing mechanism 300.

The electrode core encasing apparatus 1000 according to this embodiment fixes the housing 500 through the housing fixing mechanism 200, and fixes the electrode core 600 through the electrode core fixing mechanism 400. The encasing mechanism disposed between the housing fixing mechanism 200 and the electrode core fixing mechanism 400 is configured to rectify the position of the housing 500 according to the position of the electrode core 600, so that the electrode core 600 is well aligned with the housing 500 to facilitate encasing.

In some embodiments, the main power mechanism 100 is connected to the encasing mechanism 300 through an encasing mechanism connecting support 110. One end of the encasing mechanism connecting support 110 is fixed onto a conveyor belt of the main power mechanism 100, and the other end is connected to the encasing mechanism 300 through the encasing mechanism connecting plate 120. An encasing mechanism fixing hole 121 is made on the encasing mechanism connecting plate 120. The encasing mechanism connecting plate is connected to the encasing mechanism 300 through the encasing mechanism fixing hole 121. The encasing mechanism 300 can move up and down along with the conveyor belt as a whole under the control of the main power mechanism 100. The encasing mechanism connecting support 110 may be a plate-shaped connecting piece that extends out of the body portion of the main power mechanism 100, or may be a structure of other shapes, and serves the following purposes: through the encasing mechanism connecting support 110, the encasing mechanism 300 can be connected to a power mechanism of the main power mechanism 100; and, through the main power mechanism 100, the encasing mechanism 300 is controlled to move up and down.

As shown in FIG. 2, the housing fixing mechanism 200 is configured to fix the housing 500. When a conveyor mechanism of the housing conveys the housing 500 to the housing fixing mechanism 200, the housing fixing mechanism 200 clamps the housing 500 through a housing clamping portion 220. The housing fixing mechanism 200 is fixedly connected to one side of the encasing mechanism 300 through the housing fixing mechanism support 210. As shown in FIG. 3, a housing fixing mechanism bracket 360 is disposed on encasing mechanism 300. The housing fixing mechanism 200 is positioned together with the encasing mechanism 300 through the housing fixing mechanism support 210 and the housing fixing mechanism bracket 360. On the one hand, the housing fixing mechanism 200 may, together with the encasing mechanism 300, move up and down along with the main power mechanism 100. On the other hand, the electrode core encasing apparatus 1000 further includes an auxiliary power mechanism. The housing fixing mechanism 200 adjusts the position of the housing 500 freely through the auxiliary power mechanism.

The electrode core fixing mechanism 400 is configured to fix the electrode core 600. The electrode core fixing mechanism 400 may be positioned together with, or positioned separately from, the main power mechanism 100. The electrode core fixing mechanism 400 is generally disposed on an annular guide rail, and is configured to convey the electrode core 600 circularly, so as to convey the to-be-assembled electrode core 600 to a corresponding position on the encasing mechanism 300. As shown in FIG. 1 and FIG. 2, the electrode core fixing mechanism 400 is disposed opposite to the housing fixing mechanism 200. To put the electrode core into the housing, the electrode core 600 is generally fixed first by the electrode core fixing mechanism 400, and then the housing fixing mechanism 200 moves the housing 500 to sleeve the electrode core 600 into the housing 500.

In some embodiments, the encasing mechanism 300 is located between the housing fixing mechanism 200 and the electrode core fixing mechanism 400, and is movably connected to the main power mechanism 100 through the main power mechanism connecting plate 3502. As shown in FIG. 3, an XY floating slide block is disposed on one side of the encasing mechanism body 301. The XY floating slide block enables encasing mechanism body 301 and the main power mechanism 100 to slide freely relative to each other in different directions. The sliding directions include a first direction and a second direction. Generally, the first direction is perpendicular to the second direction.

Definitely, in other embodiments, the angle between the first direction and the second direction may be set as required.

In some embodiments, as shown in FIG. 3, a plurality of XY floating slide blocks are disposed on the encasing mechanism body 301, including a first XY floating slide block 330, a second XY floating slide block 331, a third XY floating slide block 332, and a fourth XY floating slide block 333, which are symmetrically arranged at different positions on the encasing mechanism body 301. Such positions are symmetric with respect to the center of the encasing mechanism body 301 correspondingly. The plurality of XY floating slide blocks make the connection more stable and firmer between the encasing mechanism 300 and the main power mechanism 100.

By virtue of the XY floating slide blocks, the encasing mechanism 300 floats relative to the main power mechanism 100. Therefore, the position of the encasing mechanism 300 is adjusted automatically according to the position of the electrode core 600, and the electrode core 600 is adaptively aligned with the housing 500, thereby preventing the misalignment between the housing 500 and the electrode core 600 from causing encasing difficulty and damage to the electrode core 600 or housing 500.

In some embodiments, the XY floating slide block includes an X-axis floating slide block and a Y-axis floating slide block. The X-axis floating slide block is configured to cause the encasing mechanism body 301 and the main power mechanism 100 to move relative to each other in a first direction, as shown by the arrow X in FIG. 3. The Y-axis floating slide block is configured to cause the encasing mechanism body 301 and the main power mechanism 100 to move relative to each other in a second direction, as shown by the arrow Y in FIG. 3. The first direction is perpendicular to the second direction.

Figure 5:
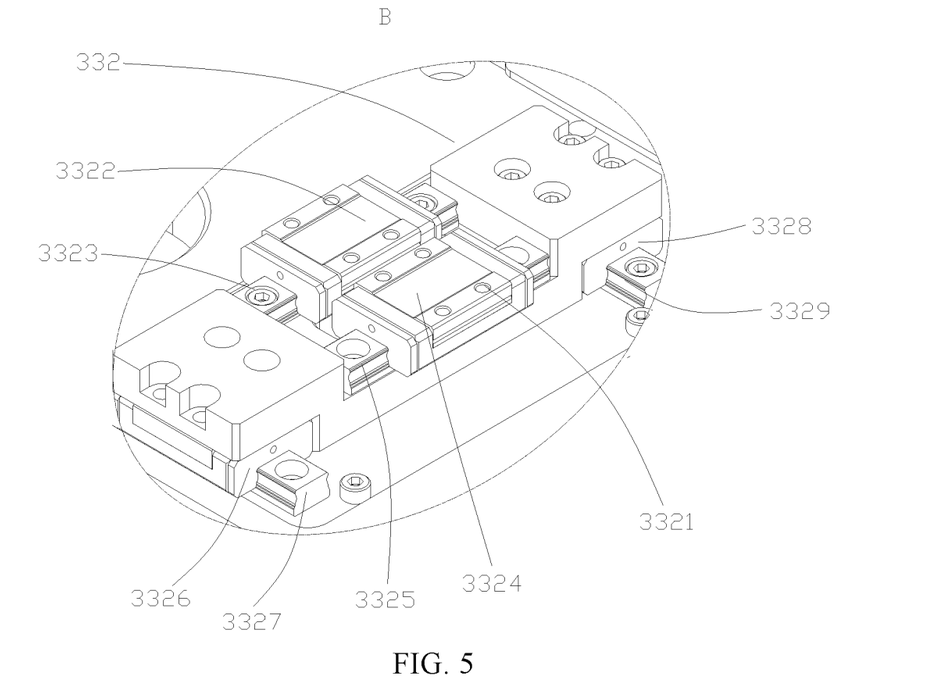
FIG. 5 is a close-up view of an XY floating slide block according to some embodiments of this application.

FIG. 5 is a close-up view of the XY floating slide blocks according to an embodiment of this application. Using the third XY floating slide block 332 as an example, the XY floating slide block includes a first X-axis floating slide block 3322, a second X-axis floating slide block 3324, a first Y-axis floating slide block 3326, and a second Y-axis floating slide block 3328. The first X-axis floating slide block 3322 and the second X-axis floating slide block 3324 are disposed together to slide in the first direction. The first Y-axis floating slide block 3326 and the second Y-axis floating slide block 3328 each are disposed at two ends of the first X-axis floating slide block 3322 and at two ends of the second X-axis floating slide block 3324, and slide in the second direction. Generally, the first direction is perpendicular to the second direction. Definitely, in other embodiments, the angle between the first direction and the second direction may be set as required.

Specifically, the first X-axis floating slide block 3322 is connected to the first X-axis floating slide rail 3323, the second X-axis floating slide block 3324 is connected to the second X-axis floating slide rail 3325, and the first X-axis floating slide rail 3323 and the second X-axis floating slide rail 3325 are arranged side by side parallel to each other. The first Y-axis floating slide block 3326 is connected to the first Y-axis floating slide rail 3327, the second Y-axis floating slide block 3328 is connected to the second Y-axis floating slide rail 3329, and the first Y-axis floating slide rail 3327 and the second Y-axis floating slide rail 3329 each are located at the two ends of the first X-axis floating slide rail 3323 and at the two ends of the second X-axis floating slide rail 3325. The two ends of the entirety of the first X-axis floating slide block 3322, the first X-axis floating slide rail 3323, the second X-axis floating slide block 3324, and the second X-axis floating slide rail 3325 are supported on the first Y-axis floating slide block 3326 and the second Y-axis floating slide block 3328 respectively through a connecting plate. As shown in FIG. 5, the first Y-axis floating slide rail 3327 and the second Y-axis floating slide rail 3329 are fixedly connected to the encasing mechanism body 301, and the first X-axis floating slide block 3322 and the second X-axis floating slide block 3324 are fixedly connected to the main power mechanism 100. Referring to FIG. 1, the main power mechanism 100 is fixedly connected to the first X-axis floating slide block 3322 and the second X-axis floating slide block 3324 by the encasing mechanism connecting plate 120. An encasing mechanism fixing hole 121 is made in the encasing mechanism connecting plate 120. A fixing hole 3321 of the encasing mechanism connecting plate is made in the first X-axis floating slide block 3322 and the second X-axis floating slide block 3324 separately. Through bolts or by other means, the encasing mechanism connecting plate 120 is disposed on the first X-axis floating slide block 3322 and the second X-axis floating slide block 3324. In this way, the relative movement of the encasing mechanism 300 and the main power mechanism 100 in the first direction and the second direction is implemented, and the position of the encasing mechanism 300 can be adjusted freely, thereby implementing adaptive flexible adjustment of the positions of the electrode core 600 and the housing 500 conveniently.

In some embodiments, the encasing mechanism 300 further includes a realignment mechanism 350. One end of the realignment mechanism 350 is connected to the encasing mechanism body 301. Another end of the realignment mechanism is connected to the main power mechanism 100. The realignment mechanism is configured to cause the encasing mechanism 300 and the main power mechanism 100 to move relative to each other to realign the encasing mechanism 300.

During the assembling of the housing 500 and the electrode core 600, the relative position between the encasing mechanism 300 and the main power mechanism 100 are adjusted, so that the position of the housing 500 is adjusted. Upon completion of assembling the housing 500 and the electrode core 600, the realignment mechanism 350 needs to readjust the relative position between the main power mechanism 100 and the encasing mechanism 300 to restore the encasing mechanism 300 to its initial position. Still referring to FIG. 3, a realignment mechanism 350 is disposed on the encasing mechanism body 301, and is configured to: after the electrode core 600 is encased in the housing through coordination between the encasing mechanism 300, the housing fixing mechanism 200, and the electrode core fixing mechanism 400, realign the encasing mechanism 300 so that the encasing mechanism is restored to the initial position, thereby facilitating subsequent encasing operations of the electrode core 600 in the housing 500. Specifically, the realignment mechanism 350 includes a first end and a second end that move relative to each other. The first end is fixedly disposed on the encasing mechanism body 301, and the other end is fixedly connected to the main power mechanism 100. The encasing mechanism 300 can float to adjust positions. Therefore, when actuated, the realignment mechanism 350 can drive the encasing mechanism body 301 to move relative to the main power mechanism 100, thereby adjusting the relative position between the main power mechanism 100 and the encasing mechanism body 300.

Through the realignment operation of the realignment mechanism 350, the encasing mechanism 300 can be realigned upon completion of the encasing operations for each electrode core, thereby preventing increase of misalignment between the housing 500 and the electrode core 600, and improving the efficiency of assembling the electrode core 600 and the housing 500.

Figure 7:
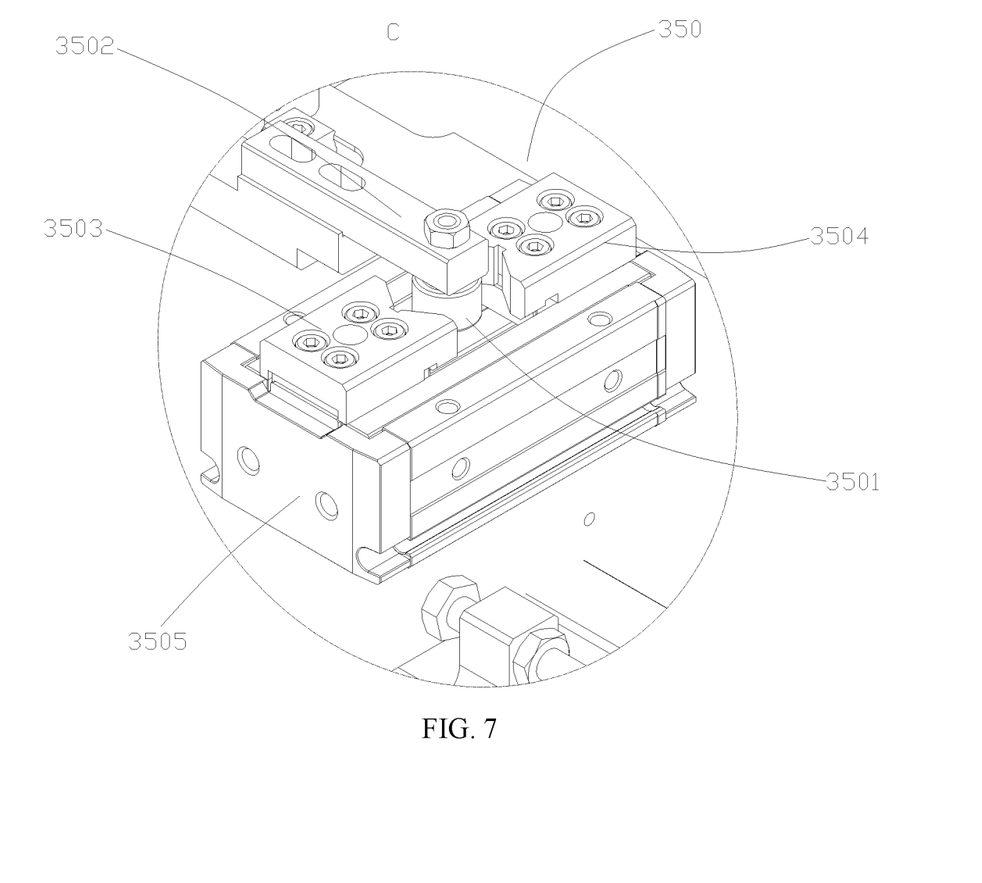
FIG. 7 is a close-up view of a realignment mechanism according to some embodiments of this application.

Referring to FIG. 7, in some embodiments, the realignment mechanism 350 includes realignment clamping mechanisms. The realignment clamping mechanisms are disposed on the encasing mechanism body 301. A main power mechanism connecting shaft 3501 is disposed between the realignment clamping mechanisms. The main power mechanism 100 is connected to the encasing mechanism 300 by the main power mechanism connecting shaft 3501. Using the main power mechanism 100 connecting shaft 3501 as a reference point, when the position of the encasing mechanism 300 deviates from the initial position, the realignment clamping mechanisms clamp the main power mechanism connecting shaft 3501. At the same time, the realignment clamping mechanism drives the encasing mechanism body 301 to move relative to the main power mechanism 100 to realign the encasing mechanism body 301.

As shown in FIG. 7, which is a close-up view of the realignment mechanism 350, the realignment mechanism 350 includes a first realignment clamping mechanism 3503 and a second realignment clamping mechanism 3504 that are disposed opposite to each other. A gripper cylinder 3505 is disposed at the bottom of the first realignment clamping mechanism 3503 and the second realignment clamping mechanism 3504. One end of the first realignment clamping mechanism 3503 and the second realignment clamping mechanism 3504 is fixed onto the encasing mechanism body 301. A main power mechanism connecting shaft 3501 is disposed between the other end of the first realignment clamping mechanism 3503 and the other end of the second realignment clamping mechanism 3504. The main power mechanism connecting shaft 3501 is connected to the main power mechanism 100 by the main power mechanism connecting plate 3502. Using the main power mechanism 100 connecting shaft 3501 as a reference point, when the position of the encasing mechanism 300 deviates from the initial position, one of the first realignment clamping mechanism 3503 or the second realignment clamping mechanism 3504 contacts the main power mechanism connecting shaft 3501 to exert a pressure against the main power mechanism connecting shaft 3501. In this case, the gripper cylinder 3505 drives the first realignment clamping mechanism 3503 and the second realignment clamping mechanism 3504 to slide. In this way, the first realignment clamping mechanism 3503 and the second realignment clamping mechanism 3504 clamp the main power mechanism connecting shaft 3501. At the same time, the gripper cylinder 3505 moves and drives the encasing mechanism body 301 to move relative to the main power mechanism 100 to realign the encasing mechanism 300. The realignment clamping mechanisms make it convenient to realign the encasing mechanism 300, and are simple in structure, thereby greatly improving the efficiency of encasing the electrode core in the housing.

In some embodiments, the mutually opposite ends of the first realignment clamping mechanism 3503 and the second realignment clamping mechanism 3504 are in the V-notched form. When the encasing mechanism 300 moves out of alignment, the V-notched ends will exert a pressure on the main power mechanism connecting shaft 3501. Under the pressure, the encasing mechanism 300 floats and automatically adjusts its position, and is realigned.

In some embodiments, in order to avoid encasing difficulty and damage to the Mylar film of the electrode core that are caused by the misalignment arising from the gravity of the housing 500 in the case that the electrode core is encased in a horizontal manner, a vertical encasing method is disclosed herein, in which the electrode core 600 and the housing 500 are assembled in a vertical manner. Specifically, the electrode core fixing mechanism 400 and the housing fixing mechanism 200 are arranged along a vertical direction. With the electrode core fixing mechanism 400 and the housing fixing mechanism 200 arranged along the vertical direction, the electrode core 600 and the housing 500 are assembled in the vertical manner to encase the electrode core, that is, in a vertical encasing manner, thereby avoiding the problems caused by a conventional horizontal encasing manner. In the conventional horizontal encasing manner, the electrode core is shifted downward during movement due to gravity, and therefore, can hardly be pushed into the housing and the Mylar film of the electrode core is prone to damage.

In some embodiments, the electrode core fixing mechanism 400 is located below the housing fixing mechanism 200. Therefore, the electrode core 600 and the housing 500 are always in a vertical state during the encasing, and the electrode core can be encased in the housing in the vertical manner, thereby avoiding the problems caused by a conventional horizontal encasing manner. In the conventional horizontal encasing manner, the electrode core is shifted downward during movement due to gravity, and therefore, can hardly be pushed into the housing and the Mylar film of the electrode core is prone to damage.

In some embodiments, a parting mechanism is movably disposed on both sides of the encasing mechanism body 301. The parting mechanisms close in to form an accommodation cavity 310. The accommodation cavity 310 is hollow and configured to accommodate the electrode core 600. The electrode core fixing mechanism 400 drives the electrode core 600 to move, so that the electrode core 600 is located in the accommodation cavity 310.

Figure 4:
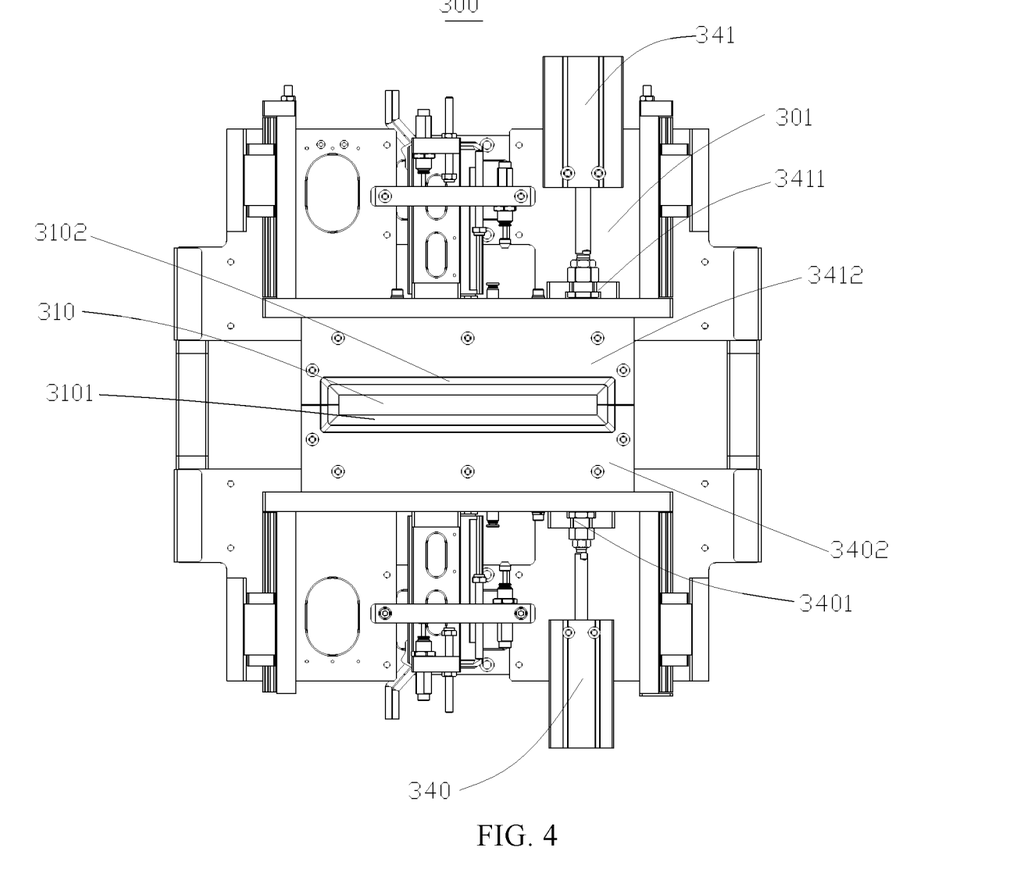
FIG. 4 is a bottom view of an encasing mechanism according to some embodiments of this application.

As shown in FIG. 3 and FIG. 4, FIG. 3 is a three-dimensional diagram of the encasing mechanism 300, and FIG. 4 is a bottom view of the encasing mechanism 300. The encasing mechanism 300 includes an encasing mechanism body 301. The encasing mechanism body 301 may be a fixing plate configured to carry various integral parts of the encasing mechanism 300. The encasing mechanism body 301 includes an upper surface and a lower surface. The upper surface is a side oriented toward the housing fixing mechanism 200, and the lower surface is a side oriented toward the electrode core fixing mechanism 400. As shown in FIG. 3, a hollow structure is disposed in the middle part of the encasing mechanism body 301, so that the housing 500 and the electrode core 600 are accommodated in the hollow structure and abut on each other.

A parting mechanism is movably disposed at the edge of the hollow structure on one side of the encasing mechanism body 301. As shown in FIG. 4, optionally, the parting mechanism is disposed on a lower surface of the encasing mechanism body 301, and disposed on a side oriented toward the electrode core fixing mechanism 400; or, may be disposed at other positions instead. The parting mechanism includes a first parting mechanism 340 and a second parting mechanism 341. The two parting mechanisms are arranged opposite to each other, and may move toward or away from each other relative to the encasing mechanism body 301. The first parting mechanism 340 includes a first parting connecting piece 3401 and a first parting connecting plate 3402. The second parting mechanism 341 includes a second parting connecting piece 3411 and a second parting connecting plate 3412. The first parting connecting piece 3401 and the second parting connecting piece 3411 are configured to drive the first parting connecting plate 3402 and the second parting connecting plate 3412, respectively, to move. A recessed structure is disposed on one side of the first parting connecting plate 3402 and one side of the second parting connecting plate 3412. When the first parting connecting plate 3402 contacts the second parting connecting plate 3412, the recessed structures on the two sides close in to form an accommodation cavity 310 configured to accommodate the housing 500 and the electrode core 600. When moving in opposite directions, the first parting connecting plate 3402 and the second parting connecting plate 3412 divide the accommodation cavity 310 into two parts, and detach the assembled electrode core 600 from an assembling workspace.

To put the electrode core into the housing, the electrode core fixing mechanism 400 first drives the electrode core 600 to move to a lower position in the accommodation cavity 310 on the encasing mechanism 300. At the same time, the housing fixing mechanism 200 drives the housing 500 to move to fit the housing 500 into the accommodation cavity 310. Through the accommodation cavity 310, the electrode core 600 can be preliminarily aligned with the housing 500 conveniently, thereby reducing errors during the encasing of the electrode core 600 in the housing, preventing the entrance of the housing 500 from scratching the Mylar film of the electrode core, and avoiding damage to the Mylar film of the electrode core.

In some embodiments, in order to prevent the opening of the housing from scratching the Mylar film of the electrode core, an encasing barrier film 3101 is disposed at a position corresponding to the edge of the accommodation cavity 310 on the parting mechanism. The encasing barrier film 3101 extends toward the center of the accommodation cavity 310, and is configured to separate the housing 500 from the electrode core 600.

Still referring to FIG. 3 and FIG. 4, in order to prevent the opening of the housing from scratching the Mylar film of the electrode core, an encasing barrier film 3101 is disposed at a position corresponding to the edge of the accommodation cavity 310 on the parting mechanism. The encasing barrier film 3101 may be disposed on all sides at the edge of the accommodation cavity 310, or may be disposed just at a corresponding position on a long side of the accommodation cavity 310, and may be fixed together with the parting mechanism by gluing, welding, or other means. The means of fixing is not limited herein. As shown in FIG. 4, the encasing barrier film 3101 is disposed at the edges of the recessed structures of the first parting connecting plate 3402 and the second parting connecting plate 3412. When the first parting connecting plate 3402 and the second parting connecting plate 3412 close in, the encasing barrier film 3101 is located in the accommodation cavity 310. When the housing 500 or the electrode core 600 moves to the accommodation cavity 310, the encasing barrier film 3101 isolates the housing 500 from the electrode core 600. The encasing barrier film 3101 may be made of an organic polymer material such as polyimide. This material is of high insulation and high toughness, and can well isolate the housing 500 from the electrode core 600 and protect the electrode core 600 from being scratched by the housing 500. In addition, after the electrode core is encased in the housing, due to good toughness, the encasing barrier film is easily extractable from between the housing 500 and the electrode core 600 without affecting the contact effect between the electrode core 600 and the housing 500, and is reusable.

By virtue of the encasing barrier film 3101, the housing 500 and the electrode core 600 first contact the encasing barrier film 3101. The encasing barrier film 3101 forms protection for the Mylar film on the surface of the electrode core, and prevents the opening of the housing from scratching the electrode core 600. When the electrode core is put into the housing to a given extent, the first parting mechanism and the second parting mechanism move to both sides, thereby driving the encasing barrier film 3101 to be extracted from between the electrode core 600 and the housing 500.

In some embodiments, in order to facilitate the electrode core 600 to enter the accommodation cavity 310, a guide ramp is disposed at a position corresponding to an edge of the accommodation cavity 310 on the parting mechanism. The guide ramp is configured to guide the electrode core 600 to settle in the accommodation cavity 310.

As shown in FIG. 4, at the edges of the recesses of the first parting connecting plate 3402 and the second parting connecting plate 3412, a first guide ramp 3102 and a second guide ramp 3103 are disposed. The guide ramps tilt toward accommodation cavity 310, and are configured to guide the housing 500 or the electrode core 600 into the accommodation cavity 310. When the electrode core 600 abuts on a guide ramp, a diagonal pressure is generated between the guide ramp and the electrode core 600. Under this pressure, the encasing mechanism 300 drives a parting connecting plate to move. In this way, the position of the parting connecting plate is adaptively adjusted according to the pressure, and then the position of the accommodation cavity 310 is adjusted accordingly. In this way, the electrode core 600 can be conveniently accommodated in the accommodation cavity 310 and aligned with the housing 500, thereby avoiding scratching of the Mylar film on the electrode core at the opening of the housing caused by misalignment between the electrode core 600 and the housing 500.

The guide ramp may be disposed on one side of the recesses of the first parting connecting plate 3402 and the second parting connecting plate 3412, or on two sides of the first parting connecting plate 3402 and the second parting connecting plate 3412. For example, the guide ramp may be disposed on a side oriented toward the electrode core fixing mechanism 400 at the recesses of the first parting connecting plate 3402 and the second parting connecting plate 3412, so as to rectify the track along which the electrode core 600 enters the accommodation cavity 310. Alternatively, the guide ramp may be disposed on a side oriented toward the housing fixing mechanism 200 at the recesses of the first parting connecting plate 3402 and the second parting connecting plate 3412, so as to rectify the track along which the housing 500 enters the accommodation cavity 310.

In some embodiments, a flaring mechanism is disposed on the encasing mechanism 300 at a position corresponding to the housing fixing mechanism 200. When the housing fixing mechanism 200 drives the housing 500 to move so that the opening of the housing is located at the flaring mechanism, the flaring mechanism is attached to an outer wall at the opening of the housing, and pulls the outer wall at the opening of the housing outward by moving to both sides, so as to flare out the opening of the housing and enable the electrode core 600 to be put into the housing 500 easily.

The flaring mechanism may be disposed on one side or both sides of a position corresponding to the housing 500. The flaring mechanism may be attached to the outer wall on one side of the opening of the housing, or attached to the outer walls on two sides of the opening of the housing, or attached to the outer walls on all sides of the opening of the housing. To achieve a better flaring effect, the flaring mechanism may be adsorbed onto the sidewalls corresponding to two long sides at the opening of the housing. This can achieve a better flaring effect.

The manner of contact between the flaring mechanism and the outer wall may be adsorption. For example, a suction cup contacts the outer wall, and then the suction cup is vacuumized to flare the outer wall. Alternatively, the flaring mechanism sticks to the outer wall at the opening of the housing to flare the housing, or attaches to the outer wall by other means, details of which are omitted here.

In this embodiment of this application, at the encasing mechanism 300, the opening of the housing is flared to enlarge the opening of the housing 500, thereby making it convenient for the electrode core 600 to enter the housing 500, and preventing the edge at the opening of the housing from damaging the Mylar film of the electrode core.

In some embodiments, in order to flare the housing 500 more effectively, a flaring mechanism is disposed on the encasing mechanism body 301 at a side toward the housing fixing mechanism 200. The flaring mechanism is disposed corresponding to the accommodation cavity 310, and is configured to flare the housing 500 accommodated in the accommodation cavity 310.

In some embodiments, as shown in FIG. 3, a first flaring mechanism 320 and a second flaring mechanism 321 are disposed on the encasing mechanism body 301 at a side toward the housing fixing mechanism 200. The first flaring mechanism 320 and the second flaring mechanism 321 are located on two sides of the accommodation cavity 310 respectively. When the housing 500 is accommodated in the accommodation cavity 310, the first flaring mechanism 320 and the second flaring mechanism 321 are connected to the outer walls of the housing 500 on two sides respectively, and drive the outer walls of housing 500 on the two sides to flare out, so that the entrance of the housing 500 is flared to facilitate entry of the electrode core 600. To improve the flaring effect, the first flaring mechanism 320 and the second flaring mechanism 321 are disposed on two sides of the housing in the thickness direction of the housing to flare the two relatively wide sidewalls, thereby improving the flaring effect. Definitely, the flaring mechanism may be disposed at two ends of the accommodation cavity 310 instead to flare the two widthwise sidewalls of the housing 500. Alternatively, the four sidewalls of the housing 500 are flared at the same time to achieve the best flaring effect. The flaring mechanism can achieve a good flaring effect, so that the electrode core 600 can enter the housing 500 more conveniently.

In some embodiments, the flaring mechanism includes a flaring suction cup 3211. The flaring suction cup 3211 is configured to be adsorbed onto a sidewall at the opening of the housing.

Figure 6:
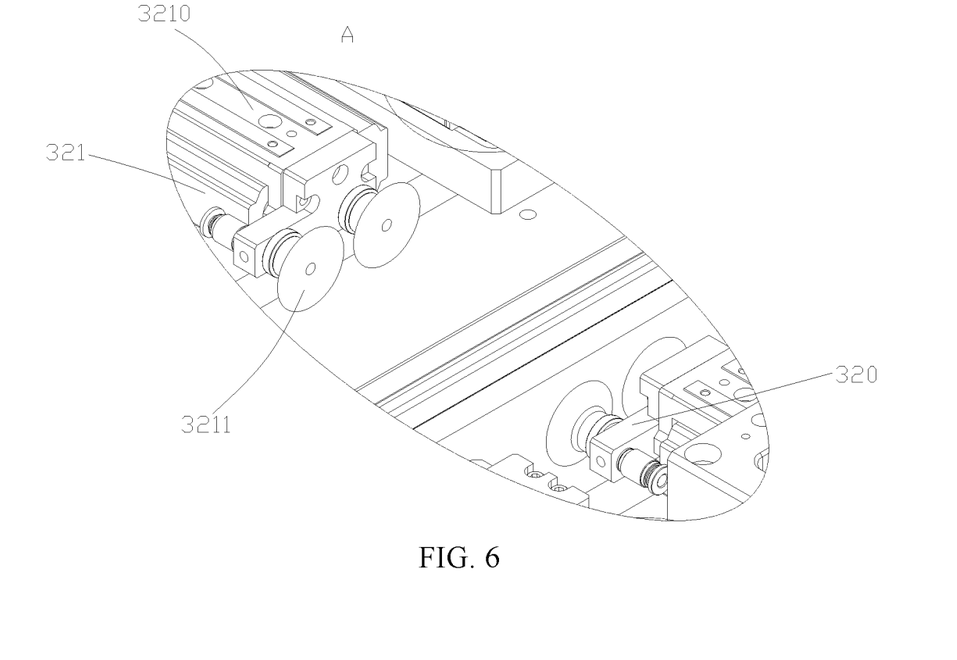
FIG. 6 is a close-up view of a flaring mechanism according to some embodiments of this application.

FIG. 6 is a close-up view of a flaring mechanism. The flaring mechanism includes a flaring air cylinder 3210 and a flaring suction cup 3211. The flaring air cylinder 3210 drives the flaring suction cup 3211 to reciprocate. The flaring suction cup 3211 is configured to be absorbed onto an outer wall of the housing 500. When the flaring suction cup 3211 abuts on the outer wall of the housing 500, the suction cup expels the internal air and adsorbs the outer wall of the housing onto the suction cup by using the pressure of the external air. The flaring air cylinder 3210 drives the suction cup to move outward, thereby flaring the housing.

The flaring suction cup 3211 facilitates adsorption onto and detachment from the outer wall of the housing, and is simple in structure, and can be operated repeatedly for a long time.

In the electrode core encasing apparatus 1000 according to this embodiment of this application, an XY floating slide block is disposed on the encasing mechanism 300, so that the encasing mechanism 300 can float freely relative to the main power mechanism 100 and the electrode core fixing mechanism 400, and can flexibly adjust the positions of the housing 500 and the electrode core 600 automatically, thereby greatly improving the efficiency of aligning the electrode core 600 with the housing 500. Further, by virtue of the realignment mechanism 350, the realignment mechanism 350 realigns the encasing mechanism 300 quickly upon completion of assembling the electrode core 600 and the housing 500, thereby avoiding excessive misalignment between the housing 500 and the electrode core 600 after repeated operations of assembling, and greatly improving the efficiency of assembling the electrode core 600 and the housing 500.

In addition, the housing fixing mechanism 200, the encasing mechanism 300, and the electrode core fixing mechanism 400 are made into a vertical structure, thereby avoiding the problem of damage to the Mylar film of the electrode core caused by the gravity of the housing when the electrode core is encased in a horizontal manner. Moreover, an accommodation cavity 310 is disposed on the encasing mechanism 300, so that the housing 500 and the electrode core 600 can be aligned up and down through the accommodation cavity 310, thereby avoiding damage to the electrode core 600 caused by misalignment between the electrode core 600 and the housing 500. To avoid scratching between the electrode core 600 and the housing 500, an encasing barrier film 3101 is disposed on the parting mechanism to isolate the electrode core 600 from the housing 500 during assembling, thereby preventing the opening of the housing from damaging the electrode core 600. In addition, in order to conveniently adjust the position of the housing 500 and realign the housing when there is an error of alignment between the electrode core 600 and the housing 500, a guide ramp is disposed on the parting mechanism in this embodiment of this application to adjust the positions of the electrode core 600 and the housing 500. By virtue of the flaring mechanism disposed on the encasing mechanism 300, the housing is flared out, so that the electrode core 600 can be conveniently placed into the housing 500.

An embodiment of this application further discloses battery cell assembling apparatus, including any of the electrode core encasing apparatus 1000 disclosed in the above embodiments. The battery cell assembling apparatus may include an electrode core preparation apparatus, a housing preparation apparatus, and an electrode core encasing apparatus 1000. The electrode core preparation apparatus is configured to convey an electrode core 600 to the electrode core encasing apparatus 1000. An assembly line operation method may be employed. After one electrode core 600 is encased in the housing, another electrode core 600 can be conveyed to an appropriate position quickly for being fixed by the electrode core fixing mechanism 400. The housing preparation apparatus is configured to provide a housing 500 to the electrode core encasing apparatus 1000. The housing 500 is conveyed to the electrode core encasing apparatus 1000 so that the electrode core encasing apparatus 1000 assemblies the electrode core 600 and the housing 500. The electrode core encasing apparatus 1000 is configured to assemble the housing 500 and the electrode core 600, and works in the same manner as what is described in the preceding embodiments, details of which are omitted here.

An embodiment of this application further discloses an electrode core assembling method. The method is applicable to the electrode core encasing apparatus disclosed in the preceding embodiments, and also applicable to other battery cell production equipment. The method is used to assemble an electrode core and a housing.

Figure 8:
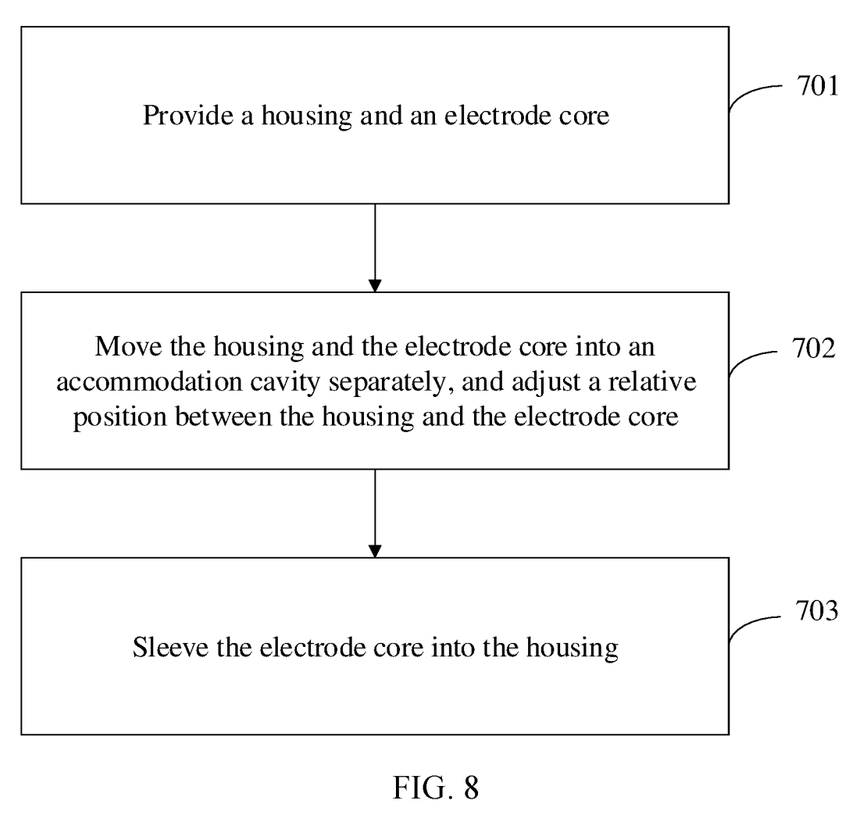
FIG. 8 is a flowchart of an electrode core assembling method according to some embodiments of this application.

As shown in FIG. 8, which is a flowchart of an electrode core assembling method according to an embodiment of this application, the method includes the following steps:

Step 701: Providing a Housing and an Electrode Core.

In this step, a housing and an electrode core to be assembled are provided in the material preparation stage. The housing and the electrode core may be provided in various manners, for example, may be provided through an automatic assembly line. For example, the electrode core preparation apparatus prepares the electrode core automatically, and automatically provides a next electrode core upon completion of assembling one electrode core; and the housing preparation apparatus prepares the housing automatically, and automatically provides a next housing upon completion of assembling one housing. Definitely, other material preparation manners are also applicable.

Step 702: Moving the Housing and the Electrode Core into an Accommodation Cavity Separately, and Adjusting a Relative Position Between the Housing and the Electrode Core.

The housing and the electrode core are moved into the accommodation cavity separately, and the accommodation cavity provides a preliminary positioning function for the electrode core and the housing. The electrode core and the housing can be conveniently positioned through the accommodation cavity, thereby alleviating the problem of damage to the electrode core caused by misalignment between the housing and the electrode core. After the housing and the electrode core are located in the accommodation cavity, the relative position between the electrode core and the housing is adjusted to facilitate subsequent encasing of the electrode core in the housing.

Step 703: Sleeving the Electrode Core into the Housing.

The housing or the electrode core is moved to sleeve the electrode core into the housing.

According to the electrode core assembling method provided in this embodiment of this application, the relative position between the electrode core and the housing can be adjusted, thereby enabling the electrode core and the housing to be aligned adaptively, facilitating the entry of the electrode core into the housing, and preventing the misalignment between the electrode core and the housing from causing damage to the electrode core or housing.

In some embodiments, in the step of providing a housing and an electrode core, the housing and the electrode core are arranged along a vertical direction.

With the housing and the electrode core arranged along the vertical direction, the electrode core and the housing are assembled in a vertical manner to encase the electrode core, that is, in a vertical encasing manner, thereby avoiding the problems caused by a conventional horizontal encasing manner. In the conventional horizontal encasing manner, the electrode core is shifted downward during movement due to gravity, and therefore, can hardly be pushed into the housing and the Mylar film of the electrode core is prone to damage.

In some embodiments, in the step of arranging the housing and the electrode core along the vertical direction, the electrode core is caused to be located below the housing. In this way, during assembling of the electrode core and the housing, the electrode core and the housing are always in a vertical state, and the electrode core can be encased and assembled in a vertical manner, thereby avoiding the problems caused by a conventional horizontal encasing manner. In the conventional horizontal encasing manner, the electrode core is shifted downward during movement due to gravity, and therefore, can hardly be pushed into the housing and the Mylar film of the electrode core is prone to damage.

In some embodiments, in order to improve the efficiency of assembling the electrode core, the accommodation cavity is realigned in time upon completion of the assembling. Through the realignment operation, the apparatus can be realigned upon completion of the encasing operations for each electrode core, thereby preventing increase of misalignment between the housing and the electrode core, and improving the efficiency of assembling the electrode core and the housing.

In some embodiments, in order to facilitate realignment between the electrode core and the housing, a guide ramp is disposed at the edge of the accommodation cavity. During movement of the housing and the electrode core, the housing is moved into the accommodation cavity, and the electrode core is moved to the accommodation cavity at the same time. The position of the accommodation cavity is rectified through the guide ramp, and the electrode core is accommodated in the accommodation cavity.

By virtue of the guide ramp, when the electrode core abuts on the guide ramp, a pressure is exerted on the accommodation cavity. Under the pressure, the accommodation cavity adaptively adjusts its position relative to the electrode core, so that the housing is automatically aligned with the battery core, thereby preventing the housing from scratching the electrode core and from damaging the Mylar film on the electrode core due to misalignment between the electrode core and the housing.

In some embodiments, in order to prevent the housing from causing damage to the electrode core, an encasing barrier film is disposed at the edge of the accommodation cavity. The housing abuts on the electrode core through the encasing barrier film, so that the electrode core is sleeved into the housing. When the housing moves to a preset position outside the electrode core, the encasing barrier film is moved to both sides of the electrode core to extract the encasing barrier film out of the housing. After completion of the assembling, the encasing barrier film is also realigned along with the realignment of the accommodation cavity.

In order to further protect the Mylar film on the surface of the electrode core, during assembling of the electrode core and the housing, an encasing barrier film is disposed at the edge of the accommodation cavity. The encasing barrier film is configured to isolate the electrode core from the housing and prevent the housing from directly contacting the electrode core, thereby alleviating the damage caused by the housing to the electrode core. At the entrance of the housing, an encasing barrier film is disposed between the electrode core and the housing. The encasing barrier film serves a function of protecting the electrode core. As the electrode core gradually enters the housing, the encasing barrier film needs to be extracted in time to prevent the encasing barrier film from mistakenly entering the electrode core and affecting the performance of the battery.

The encasing barrier film prevents the housing from directly contacting the electrode core, thereby preventing the housing from damaging the Mylar film on the electrode core, and protecting the electrode core effectively.

In some embodiments, step 702' is included between step 702 and step 703: flaring the housing.

After both the housing and the electrode core are moved into the accommodation cavity, the opening of the housing is flared by a flaring mechanism. The flaring mechanism is attached to an outer wall at the opening of the housing, and pulls the outer wall at the opening of the housing outward by moving to both sides, so as to flare the opening of the housing. In this way, the electrode core can be easily put into the housing, thereby preventing the edge at the opening of the housing from damaging the Mylar film of the electrode core.

The manner of contact between the flaring mechanism and the outer wall may be adsorption. For example, a suction cup contacts the outer wall, and then the suction cup is vacuumized to flare the outer wall. Alternatively, the flaring mechanism sticks to the outer wall at the opening of the housing to flare the housing, or attaches to the outer wall by other means, details of which are omitted here.

What is described above is merely optional embodiments of this application, but not intended to limit this application. To a person skilled in the art, various modifications and variations may be made to this application. Any modifications, equivalent replacements, improvements, and the like made without departing from the spirit and principles of this application still fall within the protection scope of claims of this application.

What is claimed is:

1. An electrode core encasing apparatus, comprising:
a main power mechanism;
a housing fixing mechanism;
an encasing mechanism; and
an electrode core fixing mechanism;
wherein:
the electrode core fixing mechanism is configured to fix an electrode core;
the housing fixing mechanism is disposed on one side of the encasing mechanism, and is configured to fix a housing and drive the housing to move;
the encasing mechanism is located between the housing fixing mechanism and the electrode core fixing mechanism, the encasing mechanism comprises an encasing mechanism body, an XY floating slide block is disposed on one side of the encasing mechanism body, one end of the XY floating slide block is connected to the main power mechanism, another end of the XY floating slide block is connected to the encasing mechanism body, and the XY floating slide block is configured to drive the encasing mechanism body to slide freely relative to the main power mechanism, so as to adjust a relative position between the housing and the electrode core; and
the main power mechanism is configured to drive the housing fixing mechanism and the encasing mechanism to move to sleeve the electrode core into the housing.

2. The electrode core encasing apparatus according to claim 1, wherein:
the XY floating slide block comprises an X-axis floating slide block and a Y-axis floating slide block;
the X-axis floating slide block is configured to cause the encasing mechanism body and the main power mechanism to move relative to each other in a first direction;

the Y-axis floating slide block is configured to cause the encasing mechanism body and the main power mechanism to move relative to each other in a second direction; and the first direction is perpendicular to the second direction.

3. The electrode core encasing apparatus according to claim 1, wherein:

the encasing mechanism further comprises a realignment mechanism; and one end of the realignment mechanism is connected to the encasing mechanism body, another end of the realignment mechanism is connected to the main power mechanism, and the realignment mechanism is configured to cause the encasing mechanism and the main power mechanism to move relative to each other to realign the encasing mechanism.

4. The electrode core encasing apparatus according to claim 3, wherein:

the realignment mechanism comprises realignment clamping mechanisms, the realignment clamping mechanisms are disposed on the encasing mechanism body, and a gripper cylinder is disposed at a bottom of the realignment clamping mechanisms;

a main power mechanism connecting shaft is disposed between the realignment clamping mechanisms, and the main power mechanism is connected to the encasing mechanism through the main power mechanism connecting shaft; and the gripper cylinder is configured to, when the realignment clamping mechanisms clamp the main power mechanism connecting shaft, drive the encasing mechanism body to move relative to the main power mechanism to realign the encasing mechanism body.

5. The electrode core encasing apparatus according to claim 4, wherein the realignment mechanism comprises a first realignment clamping mechanism and a second realignment clamping mechanism, the main power mechanism connecting shaft is disposed between the first realignment clamping mechanism and the second realignment clamping mechanism, one end of the first realignment clamping mechanism and one end of the second realignment clamping mechanism are fixed to the encasing mechanism body, and another end of the first realignment clamping mechanism and another end of the second realignment clamping mechanism are configured to, when sliding, clamp the main power mechanism connecting shaft so that the gripper cylinder drives the encasing mechanism body to move relative to the main power mechanism.

6. The electrode core encasing apparatus according to claim 5, wherein mutually opposite ends of the first realignment clamping mechanism and the second realignment clamping mechanism are in a V-notched form.

7. The electrode core encasing apparatus according to claim 1, wherein the electrode core fixing mechanism and the housing fixing mechanism are arranged along a vertical direction.

8. The electrode core encasing apparatus according to claim 7, wherein the electrode core fixing mechanism is located below the housing fixing mechanism.

9. The electrode core encasing apparatus according to claim 1, wherein:

a parting mechanism is movably disposed on a side of the encasing mechanism body, the parting mechanisms close in to form an accommodation cavity, and the accommodation cavity is hollow and configured to accommodate the electrode core; and the electrode core fixing mechanism is configured to drive the electrode core to move to position the electrode core inside the accommodating cavity.

10. The electrode core encasing apparatus according to claim 9, wherein:

an encasing barrier film is disposed at a position, corresponding to an edge of the accommodation cavity, on the parting mechanism; and the encasing barrier film extends toward a center of the accommodation cavity, and is configured to separate the housing from the electrode core.

11. The electrode core encasing apparatus according to claim 9, wherein:

a guide ramp is disposed at a position, corresponding to an edge of the accommodation cavity, on the parting mechanism; and the guide ramp is configured to guide the electrode core to settle in the accommodation cavity.

12. The electrode core encasing apparatus according to claim 9, wherein:

a flaring mechanism is disposed on the encasing mechanism body at a side facing the housing fixing mechanism; and the flaring mechanism is disposed corresponding to the accommodation cavity, and is configured to flare the housing accommodated in the accommodation cavity.

13. The electrode core encasing apparatus according to claim 12, wherein:

the flaring mechanism comprises a flaring suction cup; and the flaring suction cup is configured to be adsorbed onto a sidewall at an opening of the housing.

14. A battery cell assembling apparatus, comprising:

an electrode core encasing apparatus comprising a main power mechanism, a housing fixing mechanism, an encasing mechanism, and an electrode core fixing mechanism;

wherein:

the electrode core fixing mechanism is configured to fix an electrode core;

the housing fixing mechanism is disposed on one side of the encasing mechanism, and is configured to fix a housing and drive the housing to move;

the encasing mechanism is located between the housing fixing mechanism and the electrode core fixing mechanism, the encasing mechanism comprises an encasing mechanism body, an XY floating slide block is disposed on one side of the encasing mechanism body, one end of the XY floating slide block is connected to the main power mechanism, another end of the XY floating slide block is connected to the encasing mechanism body, and the XY floating slide block is configured to drive the encasing mechanism body to slide freely relative to the main power mechanism, so as to adjust a relative position between the housing and the electrode core; and the main power mechanism is configured to drive the housing fixing mechanism and the encasing mechanism to move to sleeve the electrode core into the housing.

15. An electrode core assembling method using the electrode core encasing apparatus according to claim 1, comprising:

providing a housing and an electrode core;

moving the housing and the electrode core separately into an accommodation cavity, and adjusting a relative position between the electrode core and the housing; and sleeving the electrode core into the housing.

16. The electrode core assembling method according to claim 15, wherein providing the housing and the electrode core comprising arranging the housing and the electrode core along a vertical direction.

17. The electrode core assembling method according to claim 16, wherein arranging the housing and the electrode core along the vertical direction comprises locating the electrode core below the housing.

18. The electrode core assembling method according to claim 15, further comprising:
realigning the accommodation cavity.

19. The electrode core assembling method according to claim 15, wherein:
a guide ramp is disposed at an edge of the accommodation cavity; and
moving the housing and the electrode core separately into the accommodation cavity comprises:
moving the housing into the accommodation cavity; and
moving the electrode core to the accommodation cavity, and rectifying a position of the accommodation cavity through the guide ramp to fit the electrode core into the accommodation cavity.

20. The electrode core assembling method according to claim 15, wherein:
an encasing barrier film is disposed at an edge of the accommodation cavity; and
sleeving the electrode core into the housing comprises:
leaving the housing to abut on the electrode core through the encasing barrier film;
sleeving the electrode core into the housing; and
moving, when the housing moves to a preset position outside the electrode core, the encasing barrier film to two sides of the electrode core and extracting the encasing barrier film out of the housing.

* * * * *